United States Patent [19]

Gaiser et al.

[11] Patent Number: 4,815,292
[45] Date of Patent: Mar. 28, 1989

[54] MULTI-PART PRIMARY PRESSURE-BALANCED PROPORTIONING VALVE WITH BRAKE PRESSURE FAILURE SWITCH

[75] Inventors: Robert F. Gaiser, Stevensville, Mich.; Donald A. Crumb, Granger; William F. Dillon, Jr., South Bend, both of Ind.

[73] Assignee: Allied-Signal Inc., Morristown, N.J.

[21] Appl. No.: 160,784

[22] Filed: Feb. 18, 1988

Related U.S. Application Data

[63] Continuation-in-part of Ser. No. 67,514, Jun. 29, 1987.

[51] Int. Cl.⁴ .................. B60T 11/20; B60T 11/32; F15B 7/00
[52] U.S. Cl. ........................... 60/534; 60/591; 303/9.63
[58] Field of Search ............... 60/534, 545, 562, 591; 303/9.62, 9.63, 9.71, 9.72, 9.73

[56] References Cited

U.S. PATENT DOCUMENTS

| | | | |
|---|---|---|---|
| 3,421,321 | 1/1969 | Lewis | 60/591 |
| 3,423,936 | 1/1969 | Stelzer | 60/591 |
| 3,463,554 | 8/1969 | Bueler | 303/6 |
| 3,480,333 | 11/1969 | Stelzer | 303/6 |
| 3,597,008 | 8/1971 | Falk | 303/6 C |
| 3,597,014 | 8/1971 | Stokes | 303/6 C |
| 3,597,015 | 8/1971 | Stokes | 303/6 C |
| 3,606,487 | 9/1971 | Kersting | 303/6 C |
| 3,614,169 | 10/1971 | Bueler | 303/6 C |
| 3,669,506 | 6/1972 | Papin et al. | 303/9.63 |
| 3,672,728 | 6/1972 | Keady et al. | 303/6 C |
| 3,708,211 | 1/1973 | Bueler | 303/6 C |
| 3,712,683 | 1/1973 | Keady et al. | 303/6 C |
| 3,717,382 | 2/1973 | Ayers, Jr. | 303/6 C |
| 3,727,989 | 4/1973 | Keady | 303/6 C |
| 3,752,271 | 8/1973 | Haraikawa | 188/345 |
| 3,752,535 | 8/1973 | Wallace | 303/6 C |
| 3,832,007 | 8/1973 | Thrush | 303/6 C |
| 3,836,204 | 9/1974 | Van Wicklin, Jr. | 303/6 C |
| 3,838,887 | 10/1974 | Stelzer | 303/6 C |
| 3,914,736 | 10/1975 | Nakamura et al. | 340/52 C |
| 3,945,686 | 3/1976 | Orzel | 303/6 C |
| 3,964,795 | 6/1976 | Mathues | 303/6 C |
| 3,975,059 | 8/1976 | Orzel | 303/9.71 |
| 4,004,839 | 1/1977 | Burgdorf | 303/9.63 |
| 4,024,712 | 5/1977 | Takeuchi | 60/535 |
| 4,057,296 | 11/1977 | Oka et al. | 303/6 C |
| 4,058,136 | 11/1977 | Falk | 137/110 |
| 4,068,901 | 1/1978 | Nyumoya | 303/6 C |
| 4,097,841 | 6/1978 | Otsuka et al. | 340/52 C |
| 4,159,755 | 7/1979 | Kang et al. | 188/151 A |
| 4,208,074 | 6/1980 | Ishigami | 303/6 C |
| 4,227,746 | 10/1980 | Schopper et al. | 303/6 R |
| 4,269,453 | 5/1981 | Sawyer | 303/9.63 |
| 4,272,659 | 6/1981 | Orzel | 200/82 D |
| 4,290,265 | 9/1981 | Maehara et al. | 60/561 |
| 4,301,653 | 11/1981 | Carré et al. | 60/535 |
| 4,474,005 | 10/1984 | Steer | 60/562 |
| 4,490,978 | 1/1985 | Hogg | 60/561 |

FOREIGN PATENT DOCUMENTS

| | | | |
|---|---|---|---|
| 117875 | 12/1979 | Japan | 303/6 C |
| 26029 | 2/1982 | Japan | 188/151 A |

Primary Examiner—Edward K. Look
Assistant Examiner—George Kapsalas
Attorney, Agent, or Firm—Larry J. Palguta; Ken C. Decker

[57] ABSTRACT

The proportioning valve assembly may be screwed into a complementary-shaped opening in a master cylinder. The valve assembly includes a differential area piston biased by a spring toward the outlet which communicates with the rear brakes. The master cylinder includes a pair of passageways which communicate primary fluid pressure and secondary fluid pressure directly to the differential area piston of the proportioning valve assembly to displace the piston to a balanced position. If there is a failure of pressure in the primary brake circuit, the proportioning valve assembly actuates the differential area piston to permit fluid flow to bypass the piston and be communicated directly to the rear brakes of the vehicle. Upon failure, a differential area sleeve surrounding the piston moves to actuate an electrical failure warning switch.

12 Claims, 3 Drawing Sheets

MULTI-PART PRIMARY PRESSURE-BALANCED PROPORTIONING VALVE WITH BRAKE PRESSURE FAILURE SWITCH

This application is a continuation-in-part of copending patent application Ser. No. 067,514, filed June 29, 1987, and now allowed.

BACKGROUND OF THE INVENTION

Field of the Invention

The present invention relates to a proportioning valve utilized in combination with a master cylinder, in particular a proportioning valve whose piston is actuated by fluid pressure received directly from the primary and secondary pressure chambers of the master cylinder.

In general, proportioning valves utilize a differential area piston in the secondary chamber brake system so that when a predetermined pressure level is reached, the piston shifts in the direction of the smaller area proportioning valve piston end. As the piston shifts, the piston contacts a poppet or seal and thus establishes a pressure restriction. Upon a further increase in secondary pressure communicated to the proportioning valve piston, the outlet pressure will rise at a rate determined by the differential areas at each end of the piston.

A proportioning valve may be coupled with the master cylinder by means of a threaded connection. The proportioning valve includes a bypass function so that upon failure of pressure in a chamber of the master cylinder, the proportioning valve responds appropriately and permits fluid pressure to be communicated freely to the rear brakes of the vehicle. Such existing designs contain numerous disadvantages such as: the primary and secondary pressure chambers of the master cylinder must be reversed which lengthens the master cylinder body; the master cylinder being stroke sensitive rather than pressure sensitive; the utilization of mechanical actuation instead of hydraulic actuation; numerous parts required for the assembly which results in high cost; and a bypass mechanism that is subject to many manufacturing tolerances and possibly subject to damage. It is highly desirable to provide a proportioning valve assembly with a bypass feature wherein it is not necessary to switch the position of the primary and secondary chambers in the master cylinder. It is also desirable to actuate the proportioning valve assembly by communicating directly pressure from the primary pressure chamber of the master cylinder to the proportioning valve assembly.

SUMMARY OF THE INVENTION

The present invention utilizes a differential area piston with one end of the piston acted upon directly by primary pressure received from the master cylinder. The other, larger diameter, end of the piston is acted upon directly by pressure received from the secondary chamber of the master cylinder. The secondary chamber fluid pressure is proportioned during actuation of the proportioning valve. The large diameter end of the piston is essentially pressure balanced after reaching the break point due to secondary outlet pressure acting on the larger diameter end and the primary pressure acting on the piston's small diameter end. Because the master cylinder primary and secondary pressures on the piston are essentially equal by utilizing the primary pressure to balance the proportioning valve piston, when the primary pressure fails the piston forces become unbalanced and thus shift the piston to a position wherein a bypass circuit is effected so that secondary pressure is communicated freely through the secondary outlet.

The present invention comprises a proportioning valve in combination with a master cylinder the master cylinder comprising a primary pressure chamber and a secondary pressure chamber, communication means for communicating fluid pressure from the respective pressure chambers to a transverse bore having said proportioning valve disposed therein, the bore having at one end a primary pressure receiving chamber located radially inwardly relative to the master cylinder and at the other end a secondary pressure receiving chamber located radially outwardly, the secondary pressure receiving chamber having an outlet opening, a differential area piston disposed within said bore and having a primary end received in the primary pressure receiving chamber and a secondary end received in the secondary pressure receiving chamber, the primary end having at least one seal thereabout in order to define a part of the primary pressure receiving chamber, the secondary end having sealing means disposed thereabout, resilient means disposed between said piston and a shoulder of said bore, the differential area piston comprising a first piston part and a second piston part, the first piston part having an extension extending into a through opening of the second piston, the extension having a seal member thereabout and the seal member aligned with a radial opening in the second piston part and engaging sealingly a shoulder of the second piston part, so that failure of pressure in the primary chamber causes the first piston part to be displaced and move the seal member from sealing engagement with the shoulder to permit fluid pressure in the second pressure receiving chamber to be communicated through the radial opening and through opening in the second part.

BRIEF DESCRIPTION OF THE DRAWINGS

The invention is described in detail below with reference to the drawings which illustrate embodiments in which.

DETAILED DESCRIPTION OF THE PREFERRED EMBODIMENT

Figure 1:
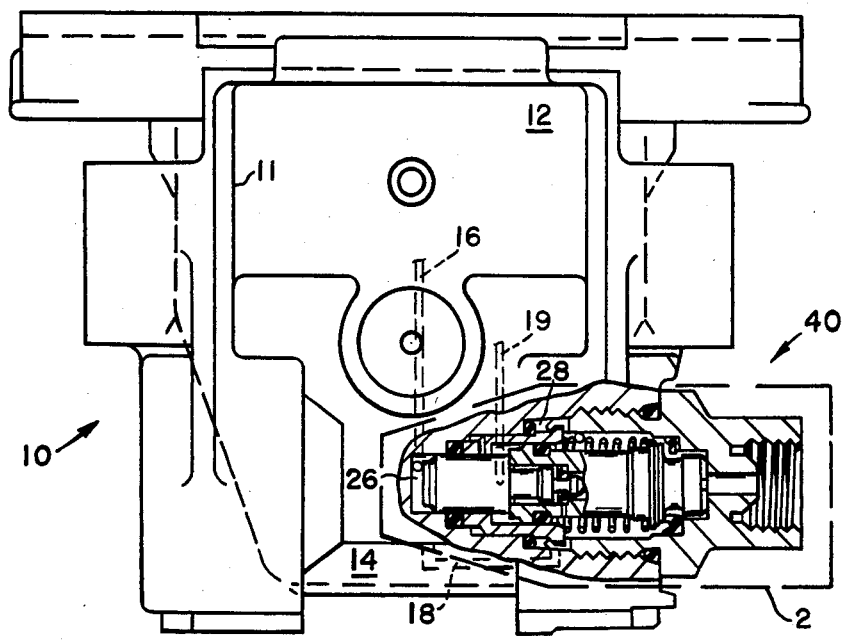
FIG. 1 is a section view of the proportioning valve and master cylinder of the present invention.
Figure 2:
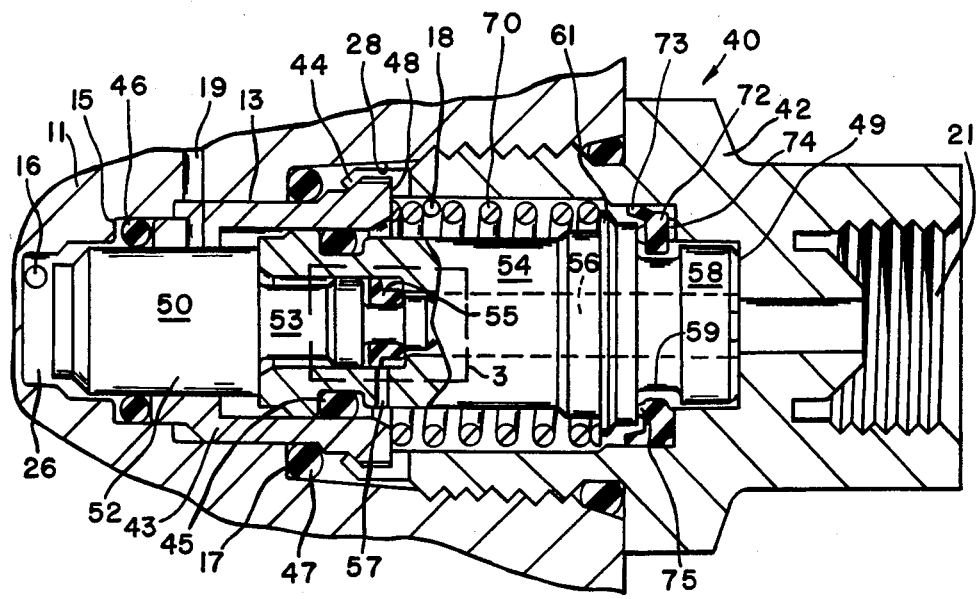
FIG. 2 is a section view of the preferred embodiment.

The master cylinder is designated generally by reference numeral 10 in FIG. 1. The master cylinder is of the type designated "Recessed Cartridge Master Cylinder" and disclosed in U.S. Pat. No. 4,474,005. It should be clearly understood that the present invention may be utilized with many other types of master cylinders, and is not restricted to use with just a recessed cartridge master cylinder. The master cylinder 10 includes a primary chamber (not shown) located interiorly of an end 12 and a secondary chamber (not shown) located interiorly of end 14. A passageway or communication means 16 extends from the primary chamber to a primary pressure receiving chamber 26 located within master cylinder housing 11. A passageway or communication means 18 extends between the secondary pressure chamber and a secondary pressure receiving chamber 28 located within housing 11. A vent 19 may extend to either atmosphere or to a reservoir (not shown) of the master cylinder. The proportioning valve assembly is designated generally by reference numeral 40 and comprises a valve housing part 42 received threadably in transverse bore 13 of housing 11. Bore 13 comprises a stepped bore which extends from the primary pressure receiving chamber 26 to the secondary pressure receiving chamber 28. Proportioning valve assembly 40 includes a valve housing part 43 clasped to first housing part 42 by means of a flange 44. Stepped bore 13 provides a shoulder 15 for engagement by a seal 46 disposed about differential area piston 50. Differential area piston 50 includes a first piston part 52 and second piston part 54. First piston part 52 includes an extension 53 received within a through opening 56 of second piston part 54. Extension 53 includes a seal 55 disposed thereabout, the seal blocking fluid flow between a radial opening 57 and through opening 56 in second piston part 54. The second piston part 54 has a seal 45 disposed thereabout and engaging the interior of second housing part 43. Resilient means 70 extends between a second housing shoulder 48 and a flange 61 of second piston part 54. A seal 47 is disposed about the exterior of second housing part 43 and engages a shoulder 17 of housing 11. The second piston part 54 has an end 58 which abuts shoulder 49 of housing part 42. Piston end 58 includes sealing means 72 disposed thereabout. Sealing means 72 has a flexible pumping arm 73, radial passageways 74, and spaced apart circumferential abutments 75. The interior diameter of resilient sealing means 72 is spaced radially apart from the exterior surface of circumferential groove 59 of piston second part 54. Each of the seals disposed about the exterior of assembly 40 is a static seal which engages a portion of stepped bore 13 when valve assembly 40 is threadably received within housing 11.

Figure 3:
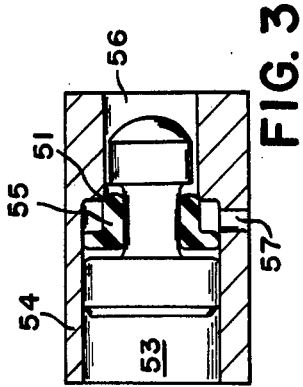
FIG. 3 is an enlarged section view of a portion of FIG. 2.

Proportioning valve assembly 40 is shown in an at-rest position. When master cylinder 10 is actuated by the vehicle operator depressing the brake pedal of the vehicle, primary and secondary chamber fluid pressure is communicated by means of passageways 16 and 18 to the respective pressure receiving chambers 26 and 28. Because of the diameters of differential area piston 50, the secondary pressure displaces piston 50 slightly toward the left in FIG. 1, against the force of resilient means 70 and the primary fluid pressure in chamber 26 acting upon first piston part 52. Upon an increase of fluid pressures received in chambers 26 and 28, piston 50 is displaced to the left until the outer diameter of piston end 58 engages sealing means 72. This causes a restriction or metering of fluid pressure communicated between passageway 18, pressure-receiving chamber 28, and secondary outlet 21. It should be noted that prior to the leftward movement of the piston 50, the abutments 75 on sealing means 72 ensures that fluid pressure is free to pass between the interior diameter of sealing means 72 and circumferential groove 59 to the secondary outlet 21. As shown in greater detail in FIG. 3, seal 55 has a generally L-shaped section and engages shoulder 51 of second piston part 54. Seal 55 avoids contact with radial opening 57 so that opening 57 cannot cut or gouge out parts of seal 55. Thus, sealing is accomplished at shoulder 51 so that fluid does not flow through opening 56. Should there be a failure of pressure in the primary chamber of master cylinder 10, an unbalancing of forces is created and first piston part 52 moves immediately leftward in chamber 26 which causes extension 53 to move seal 55 out of sealing engagement with shoulder 51. This permits fluid pressure within secondary pressure receiving chamber 28 to be communicated through radial opening 57 and through opening 56 to outlet 21 so that a bypass function is accomplished and full braking pressure may be communicated to the rear brakes of the vehicle. As a result of communicating the master cylinder primary chamber pressure directly to the differential area piston of the proportioning valve assembly, there is no longer required the utilization of primary pressure to indirectly effect a bypass by means of other intermediate mechanisms. The fluid pressure from the primary chamber of the master cylinder acts directly upon the proportioning valve piston to eliminate any need for reversing the primary and secondary chambers of the master cylinder. No external mechanical mechanisms are required in order to actuate the proportioning valve assembly and effect the bypass function. The primary pressure is required for operation of the proportioning valve assembly. However, should there be a failure of fluid pressure in the primary braking circuit, the proportioning valve assembly actuates immediately to effect the bypass feature and permit the direct communication of full fluid pressure to secondary outlet 21 and the rear brakes of the vehicle.

Figure 4:
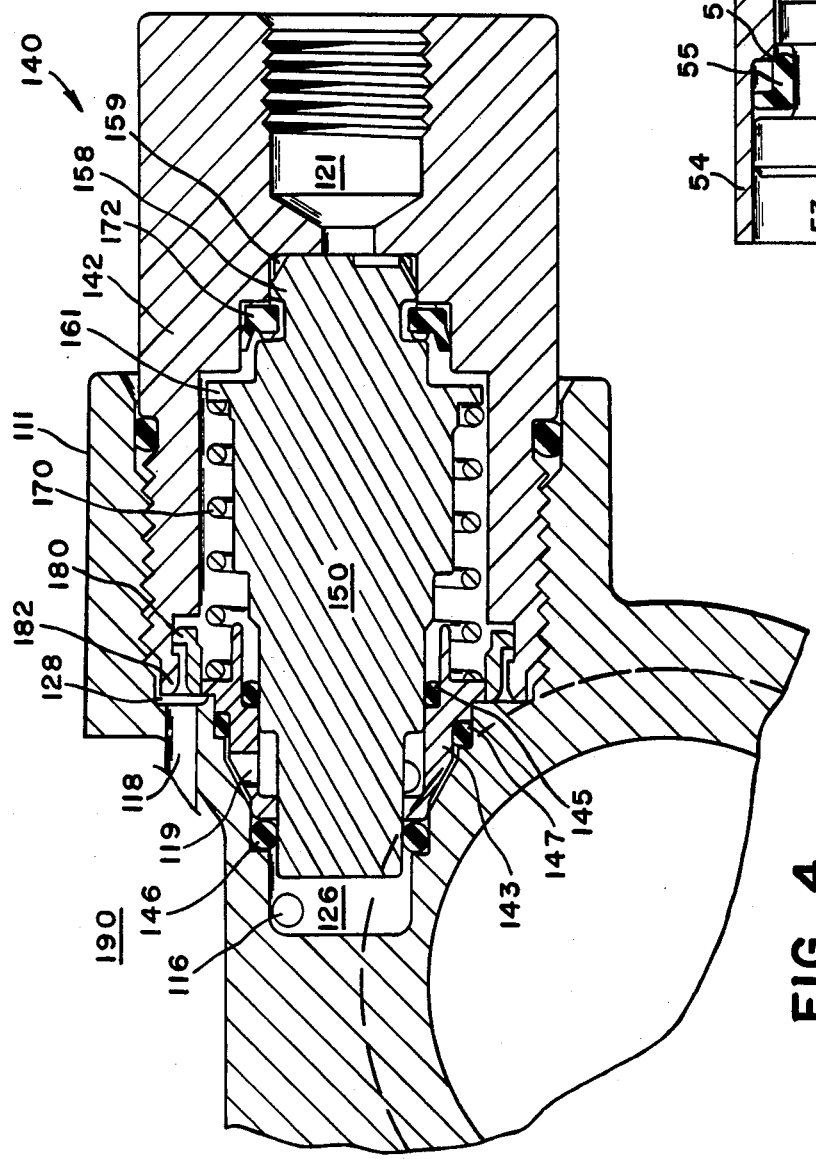
FIG. 4 is a section view of an alternative embodiment.

FIG. 4 illustrates an alternative embodiment, and similar structure is indicated by the same reference numeral increased by 100. The piston 150 comprises a single part, integral piston having disposed thereabout a sleeve or second housing part 143 which includes a flange 180 which snaps together with flange 182 of first housing part 142. The vent 119 communicates with either the reservoir 190 or with atmosphere. Proportioning valve assembly 140 operates as described above except that upon failure of fluid pressure in the primary chamber of the master cylinder and primary pressure-receiving chamber 126, the entire piston 150 moves to the left in FIG. 4 and displaces end 158 through the interior diameter of sealing means 172. Fluid pressure in secondary pressure receiving chamber 126 may then communicate past the inside diameter of sealing means 172 and through slots 159 of piston 150 to secondary outlet 121.

Figure 5:
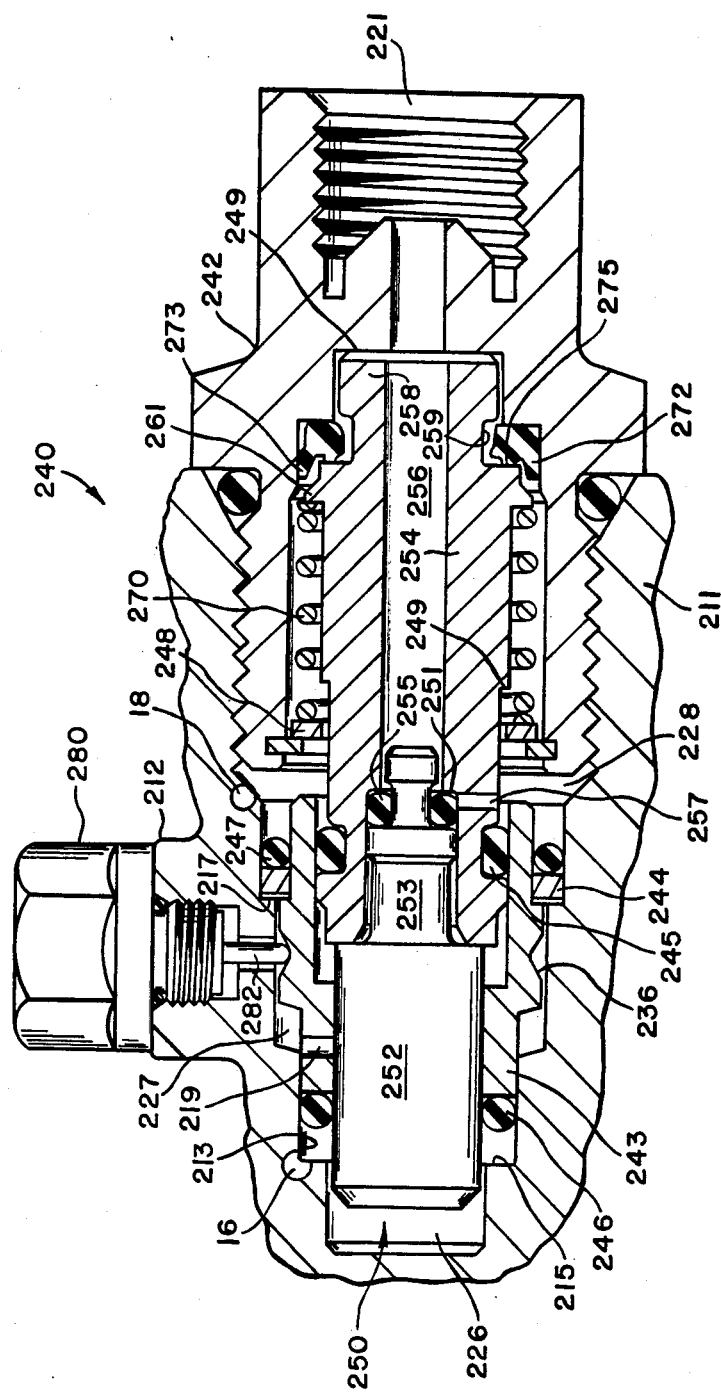
FIG. 5 is a section view of a second alternative embodiment.

FIG. 5 illustrates a second alternative embodiment, and similar structure is indicated by the same reference numeral increased by 100. The embodiment of FIG. 5 may be utilized with the master cylinder 10 described above, wherein the passageway or communication means 16 extends from the primary chamber to a primary pressure receiving chamber 226 located within the master cylinder housing 211. A passageway or communication means 18 extends between the secondary pressure chamber and a secondary pressure receiving chamber 228 located within housing 211. The proportioning valve assembly is designated generally by reference numeral 240 and comprises a valve housing part 242 received threadably in transverse bore 213 of housing 211. Bore 213 comprises a stepped bore which extends from the primary pressure receiving chamber 226 to the secondary pressure receiving chamber 228. Stepped bore 213 provides a shoulder 215 for engagement by a movable seal 246 disposed about differential area piston 250. Differential area piston 250 includes a first piston part 252 and a second piston part 254. First piston part 252 includes an extension 253 received within a through opening 256 of second piston part 254. Extension 253 includes a seal 255 disposed thereabout, the seal blocking fluid flow between a radial opening 257 and through opening 256 in second piston part 254. Second piston part 254 has an interior seal 245 disposed thereabout and engaging the interior of differential area sleeve 243. Differential area sleeve 243 is disposed about interfitted ends of first piston part 252 and second piston part 254. Sleeve 243 abuts and effects movement of movable seal 246 disposed about first piston part 252. Sleeve 243 includes an exterior recessed abutment area 236 which receives a probe 282 of warning switch mechanism 280. Differential area sleeve 243 also includes thereabout a ring 244 which abuts seal 247 and a housing shoulder 217. Warning switch mechanism 280 is disposed within housing boss 212 and probe 282 extends into an intermediate chamber 227 defined between movable seal 246 and seal 247 disposed about the exterior of sleeve 243 and engaging bore 213. Resilient means 270 extends between a housing shoulder 248 and a flange 261 of second piston part 254. Second piston part 254 has an end 258 which abuts shoulder 249 of housing 242. Piston end 258 includes sealing means 272 disposed thereabout. Sealing means 272 has a flexible pumping arm 273 and spaced apart circumferential abutments 275. The interior diameter of sealing means 272 is spaced radially apart from the exterior surface of circumferential groove 259 of piston second part 254.

Proportioning valve assembly 240 is shown in an at rest position. When master cylinder 10 is actuated by the vehicle operator depressing the brake pedal of the vehicle, primary and secondary chamber fluid pressure is communicated by means of passageways 16 and 18 to the respective pressure receiving chambers 226 and 228. Because of the respective diameters of the first piston part 252 and second piston part 254, the secondary pressure displaces piston 250 slightly toward the left in FIG. 5, against the force of resilient means 270 and the primary fluid pressure in chamber 226 acting upon first piston part 252. Upon an increase of fluid pressures received in chambers 226 and 228, piston 250 is displaced to the left until the outer diameter of piston end 258 engages sealing means 272. This causes a restriction or metering of fluid pressure communicated between passageway 18, receiving chamber 228, and secondary outlet opening 221. It should be noted that prior to the leftward movement of piston 250, the abutments 275 on sealing means 272 ensures that fluid pressure is free to pass between the interior diameter of sealing means 272 and the circumferential groove 259 of secondary outlet opening 221. Seal 255 disposed about extension 253 seals the passageway 257 so that secondary pressure received within secondary pressure receiving chamber 228 cannot enter through opening 257. Should there be a failure of pressure in the primary chamber of master cylinder 10, an unbalancing of forces is created and first piston part 252 moves immediately leftward in chamber 226 along with leftward displacement of second piston part 254. Second piston part 254 moves leftward until shoulder 249 abuts the housing shoulder 248 and stops movement thereof. The first piston part 252 continues to move leftward and the extension 253 moves the seal 255 out of sealing engagement with the shoulder 251 of second piston part 254. This permits fluid pressure within secondary pressure receiving chamber 228 to be communicated through radial opening 257 and through opening 256 to outlet opening 221 so that a bypass function is accomplished and full braking pressure may be communicated to rear brakes of the vehicle. Concurrent with the movement of the respective piston parts 252 and 254, the differential area sleeve 243 is sensitive to the unbalancing of pressure between chambers 226 and 228, so that differential area sleeve 243 moves leftward due to primary chamber pressure failure and causes probe 282 to be biased upwardly and actuate warning switch mechanism 280. Likewise, if there is a failure of pressure within secondary pressure receiving chamber 228, sleeve 243 will be displaced to the right and cause actuation of warning switch mechanism 280. Differential area sleeve 243 is utilized as a warning switch piston which is able to detect differential pressure. The detection of a predetermined differential pressure between the chambers 226 and 228 results in the actuation of the warning switch 280. By having mechanism 280 and sleeve 243 disposed within master cylinder 10 via internal porting, there is eliminated the necessity of primary and secondary pressure lines from the master cylinder outlets to be directed to a separate warning mechanism. The differential area sleeve serves as a spool concentric with first piston part 252. Sleeve 243 provides first piston part 252 with a bore for receiving piston part 252, and also enables the positioning of seal 246 about part 252. Because of the integration of warning switch mechanism 280 with proportioning valve 240, the basic master cylinder die cast body can, with minimal machining, provide at the outlet opening 221: (1) secondary pressure only (unregulated), (2) proportioned outlet pressure, (3) proportioned outlet pressure with pressure differential warning, and (4) pressure differential warning only.

The proportioning valve assembly and master cylinder of the present invention comprises a substantial improvement over prior constructions. Because the primary chamber fluid pressure is utilized to actuate and operate directly the proportioning valve assembly, intermediate mechanisms and devices and reversal of the pressure chambers of the master cylinder are obviated. An additional advantage is that the proportioning valve assembly and master cylinder permit the communication of greater fluid pressure to the rear brakes of the vehicle when such can be tolerated. In other words, the break point on the pressure curve may be led or lagged according to design modification. In actual operation, the fluid pressures communicated from the primary and secondary chambers of the master cylinder are slightly different, in the magnitude of approximately 20 to 30 psi. The fluid pressure variance communicated from the primary pressure chamber of the master cylinder is approximately 20 to 30 psi. lower than the fluid pressure communicated from the secondary pressure chamber. This is a result of difference in spring loads and seal friction. Thus, during actual braking, the front brakes of the vehicle receive slightly less pressure than the rear brakes of the vehicle receive initially. Therefore, the front brakes are slightly less effective and there is not a shifting of the load off the rear wheels, i.e., the rear portion of the vehicle does not tilt to the extent that it might if the pressures transmitted from the primary and secondary pressure chambers were actually equal. Because of reduced tilting of the vehicle, the rear wheels of the vehicle can tolerate more fluid pressure. In the present invention, the initial slight leftward movement of the differential area piston allows a greater amount of pressure to the rear brakes. This effects a raising of the break-point of the characteristic output pressure curve.

While the invention has been described with respect to the detailed embodiments, it will be understood that the invention is capable of numerous rearrangements, modifications, and alterations, and such are intended to be within the scope of the appended claims. It is reasonably to be expected that those skilled in the art can make numerous revisions and additions to the invention and it is intended that such revisions and additions will be included in the scope of the following claims as equivalents of the invention.

We claim:

1. A proportioning valve in combination with a master cylinder, the master cylinder comprising a primary pressure chamber and a secondary pressure chamber, communication means for communicating fluid pressure from the respective pressure chambers to a transverse bore having said proportioning valve disposed therein, the bore having at one end a primary pressure receiving chamber located radially inwardly relative to the master cylinder and at the other end a secondary pressure receiving chamber located radially outwardly, the secondary pressure receiving chamber having an outlet opening, a differential area piston disposed within said bore and having a primary end received in the primary pressure receiving chamber and a secondary end received in the secondary pressure receiving chamber, the primary end having at least one seal thereabout in order to define a part of the primary pressure receiving chamber, the secondary end having sealing means disposed thereabout, the differential area piston comprising a first piston part and a second piston part, the first piston part having an extension extending into a through opening of the second piston part, the extension having a seal member thereabout aligned with a radial opening in the second piston part, the second piston part biased by resilient means towards said outlet opening, a differential area sleeve disposed about said first piston part and second piston part, a sealing mechanism disposed at the second piston part and differential area sleeve so that an area between the sealing mechanism and seal disposed about the primary end defines an intermediate chamber, and warning switch means disposed adjacent said intermediate chamber and extending into the intermediate chamber to engage abutment means disposed at said sleeve, so that failure of pressure in one of the primary chamber and secondary chambers causes the differential area sleeve to be displaced and effect operation of said warning switch means.

2. The proportioning valve and master cylinder in accordance with claim 1, wherein the sealing mechanism comprises a seal disposed about said sleeve to define a portion of said intermediate chamber, and an interior seal disposed within an interior through opening of the sleeve and between the sleeve and second piston part.

3. The proportioning valve and master cylinder in accordance with claim 1, wherein the abutment means comprises a V-shaped recess disposed in an outer surface of said differential area sleeve.

4. The proportioning valve and master cylinder in accordance with claim 3, further comprising a ring disposed about an end of said differential area sleeve and abutting said sealing mechanism.

5. The proportioning valve and master cylinder in accordance with claim 4, wherein the differential area sleeve includes a vent opening which communicates an interior through opening of the sleeve with the intermediate chamber.

6. The proportioning valve and master cylinder in accordance with claim 5, wherein the intermediate chamber and vent communicate with atmosphere.

7. A proportioning valve in combination with warning means, the proportioning valve received in a bore having communication means for receiving fluid pressure communicated to the bore, the bore having at one end a first pressure receiving chamber and at the other end a second pressure receiving chamber, the second pressure receiving chamber having an outlet opening, a differential area piston disposed within said bore and having a first end received in the first pressure receiving chamber and a second end received in the second pressure receiving chamber, the first end having a seal thereat in order to define a part of the primary pressure receiving chamber, the second end having sealing means disposed thereat, the differential area piston comprising a first piston part and a second piston part, the first piston part having an extension extending into a through opening of the second piston part, the extension having a seal member and the seal member controlling fluid flow through a second opening in the second piston part, the second opening communicating with the through opening, the second piston part biased by resilient means toward said outlet opening, a differential area sleeve disposed about said first piston part, a sealing mechanism disposed at the differential area sleeve so that an area between the sealing mechanism and seal at the first end defines an intermediate chamber, and warning means disposed adjacent said intermediate chamber and extending into the intermediate chamber to engage abutment means disposed at said sleeve, so that failure of pressure in one of the first and second pressure receiving chambers causes the differential area sleeve to be displaced and effects operation of said warning means.

8. The proportioning valve and warning means in accordance with claim 7, wherein the sealing mechanism comprises a seal disposed about said sleeve to define a portion of said intermediate chamber, and an interior seal disposed within an interior through opening of the sleeve and between the sleeve and second piston part.

9. The proportioning valve and warning means in accordance with claim 7, wherein the abutment means comprises a V-shaped recess disposed in an outer surface of said differential area sleeve.

10. The proportioning valve and warning means in accordance with claim 9, further comprising a ring disposed about an end of said differential area sleeve and abutting said sealing mechanism.

11. The proportioning valve and warning means in accordance with claim 10, wherein the differential area sleeve includes a vent opening which communicates an interior through opening of the sleeve with the intermediate chamber.

12. The proportioning valve and warning means in accordance with claim 11, wherein the intermediate chamber and vent opening communicate with atmosphere.

* * * * *